United States Patent [19]

Christian et al.

[11] Patent Number: 4,533,995
[45] Date of Patent: Aug. 6, 1985

[54] METHOD AND SYSTEM FOR HANDLING SEQUENTIAL DATA IN A HIERARCHICAL STORE

[75] Inventors: John H. Christian; Michael H. Hartung; Arthur H. Nolta; David G. Reed; Richard E. Rieck; John S. William, all of Pima County, Ariz.

[73] Assignee: International Business Machines Corporation, Armonk, N.Y.

[21] Appl. No.: 289,632

[22] Filed: Aug. 3, 1981

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,171,099 | 2/1965 | Foulkes | 364/200 |
| 3,341,817 | 9/1967 | Smeltzer | 364/200 |
| 3,521,240 | 7/1970 | Bahrs et al. | 364/200 |
| 3,820,078 | 6/1974 | Curley et al. | 364/200 |
| 4,047,243 | 9/1977 | Dijkstra | 364/200 |
| 4,126,893 | 11/1978 | Cronshaw et al. | 364/200 |
| 4,157,587 | 6/1979 | Joyce et al. | 364/200 |
| 4,195,342 | 3/1980 | Joyce et al. | 364/200 |
| 4,262,332 | 4/1981 | Bass et al. | 364/200 |
| 4,346,439 | 8/1982 | Huno et al. | 364/200 |
| 4,370,710 | 1/1983 | Kroft | 364/200 |
| 4,371,924 | 2/1983 | Schaefer et al. | 364/200 |
| 4,371,927 | 2/1983 | Wilhite et al. | 364/200 |
| 4,394,732 | 7/1983 | Swenson | 364/200 |

Primary Examiner—James D. Thomas
Assistant Examiner—David L. Clark
Attorney, Agent, or Firm—H. F. Somermeyer

[57] ABSTRACT

Data is promoted from a backing store (disk storage apparatus termed DASD) to a random access cache in a peripheral data storage system. When a sequential access bit is sent to the storage system, all data specified in a read command is fetched to the cache from DASD. If such prefetched data is replaced from cache and the sequential bit is on, a subsequent host access request for such data causes all related data, up to a predetermined maximum, not yet read to be promoted to cache.

14 Claims, 9 Drawing Figures

METHOD AND SYSTEM FOR HANDLING SEQUENTIAL DATA IN A HIERARCHICAL STORE

FIELD OF INVENTION

The invention relates to peripheral memory systems of the hierarchical type, particularly, it relates to the transfer of data signals from the backing store to a front store of such memory system.

DISCUSSION OF THE PRIOR ART

Peripheral memory systems which are attachable to a host (central processing unit and the like) serve diverse purposes with respect to the host. Some systems store user data while others store so-called paging and swapping data, such as can be used in connection with paging and swapping program data sets. An example of a paging store is the IBM 2305 Fixed Head Storage Module which is described in publication GA26-1589-3 "Reference Manual for IBM 2835 Storage Control and IBM 2305 Fixed Head Storage Module" available from International Business Machines Corporation, Armonk, N.Y. This peripheral memory system consists of a magnetic storage drum which provides rapid access to the stored data. Because of its limited storage capacity, larger hosts requiring larger capacities cannot always efficiently use the IBM 2305 paging store to its maximum efficiency; extra capacity is provided by disk type direct-access storage devices (DASD) Such overflow occurs when so-called swapping data sets are used, i.e., large sequential sets of data which are rapidly transferred between a host and a peripheral memory. To alleviate storage capacity limitations, while not sacrificing performance criteria, a hierarchical store can be substituted for the 2305 storage drum. An example of such a hierarchical store is shown in Eden, et al, U.S. Pat. No. 3,569,938. This patent teaches the concept of an apparent store of high performance and high capacity through the use of a high speed cache memory operatively coupled to a backing store, such as a (DASD) or a magnetic tape recorder. Eden, et al, teach that it is beneficial to page data from the backing store to the cache or front store upon demand, including paging the data that surrounds the requested data. While this arrangement is highly successful for general application of peripheral memories, when a series of backing stores share a common cache and the host is employing multitasking, the placement of large sets of sequential data in the cache becomes troublesome. One solution is to try to make a larger cache. This solution unnecessarily adds to cost of the peripheral memory system, and hence is undesirable. Accordingly, some better solution is needed.

The Belady U.S. Pat. No. 3,588,839 shows promoting a next word of data whenever a given word is requested. This arrangement works fine for a cache on a main memory. However, where large sets of data are being transferred, only promoting one additional set of data does not necessarily provide for maximal utilization of the peripheral memory system by the host. This lack of maximal use is aggravated by the physical characteristics of the backing store. For example, in DASD backing stores there are several significant access delay boundaries caused by the mechanical characteristics of the disk storage apparatus. When selecting one disk storage apparatus or another disk storage apparatus, substantial delays can be incurred. Additionally, most disk storage apparatus for controlling costs have but one or two transducers per recording surface. In such apparatus, access to all of the data areas on the disk storage apparatus is achieved by radially moving the transducers for accessing various ones of the concentric record storage tracks. Such head movements are called cylinder seeks and involve substantial time delays when measured in terms of electronic speeds. Accordingly, the Belady solution, while eminently satisfactory for many applications, does not solve the problem of handling large sequential data sets in a multi-tasked multi-device DASD environment.

The Tobias U.S. Pat. No. 3,898,624 shows a cache connected intermediate a host and its main memory. According to this patent, an operator control panel is used to select when to promote one line of data from the main memory to the cache. The promotion always includes but one line of data. While this system may be employed to advantage in certain situations, such as in a main memory to host relationship, it does not in any manner address the large sequential data set problem mentioned above.

It is also desired that in any of these peripheral memory systems to minimize host intervention in the system. An example of such minimization of host intervention is shown in Bass, et al U.S. Pat. No. 4,262,332 which employs high use characteristics and a define extent machanism for minimizing host access to DASD peripheral systems. While this certainly provides for a minimization of host intervention in such devices, it does not indicate how to handle large sequential data sets with a shared cache in a multi-tasking multi-device DASD environment.

Data sets can be organized in several ways, such as random sequential, etc. Records or data blocks of a sequential data set are stored in physical rather than logical sequence. Given one record, the location of the next record is determined by its physical position in the data set. Sequential organization is used for all magnetic-tape devices, and may be selected for DASD. In indexed sequential data sets, records or data blocks are arranged in sequence, according to a key that is a part of every record, on the tracks of a DASD. An index or a set of indexes maintained by the system gives the location of certain principal records. This permits direct as well as sequential access to a record.

SUMMARY OF THE INVENTION

It is the principle object of the present invention to provide methods and systems for reducing a number of delays in sequential data signal transfers while minimizing cache front store or buffer size, while transferring such sequential data signals between a backing store through a cache to a host using chains of peripheral commands. The invention contemplates a peripheral memory system receiving an indication from the host that sequential data will be requested by the host in an upcoming set of peripheral operations. The set is characterized by a sequence of related peripheral commands (one chain of commands). Along with the host-supplied sequential indication is an electrical indication of a number of blocks of said data signals which will be sequentially accessed up to an end address of the indicated sequential data. The peripheral memory system stores the electrical indications of said numbers and addresses along with the sequential indication such that subsequently received peripheral commands can be efficiently executed by a series of related peripheral commands. The operation of the cache is such that each time a cache miss occurs, the peripheral memory system examines the cache contents and assigns a plurality of randomly selected areas of the cache to receive the sequential data. Then a predetermined number of blocks of sequential data are rapidly transferred from the backing store, such as a disk storage apparatus, to the cache. A directory is then updated indicating which of the randomly selected areas within the cache contain the sequential data. Each time a block of such sequential data is requested, the directory points to the data in the cache as if it were being received sequentially from the backing store.

In another mode of operation of the present invention, all data defined by the host as being sequential is promoted to the cache. For example, if eight blocks of data are indicated as being sequential, initially the eight blocks are promoted to cache. The host can read three blocks of such data. Assume that because of replacement algorithms, the other five blocks are replaced. The next time a host requests the fourth block of data, a cache miss occurs (fourth block was replaced and is not in the cache). The peripheral memory system, when sequential data is indicated, then automatically promotes the remainder of the sequential data, i.e., blocks 4 through 8, to the cache for use by the host.

Promotion of sequential data may incur a given error condition in a given block of data. The block in error is not promoted to the cache, rather all preceding blocks are promoted the cache; all blocks following the block in error could be promoted to the cache. The host then reads the promoted blocks of data from the cache. Any attempted access by the host of the non-promoted block in error results in a cache miss. A single host retry may occur on the missed data. If the retry is unsuccessful, a permanent error is indicated to the host; then the sequential data in the blocks following the block in error can be read from the cache. Recovery of the block in error can be provided by overriding actions of the host for directly accessing the disk storage apparatus (cache bypass). This type of recovery may not enable recovery from errors in the DASD.

The foregoing and other objects, features, and advantages of the invention will be apparent from the following more particular description of preferred embodiments of the invention, as illustrated in the accompanying drawing.

DETAILED DESCRIPTION

Figure 1:
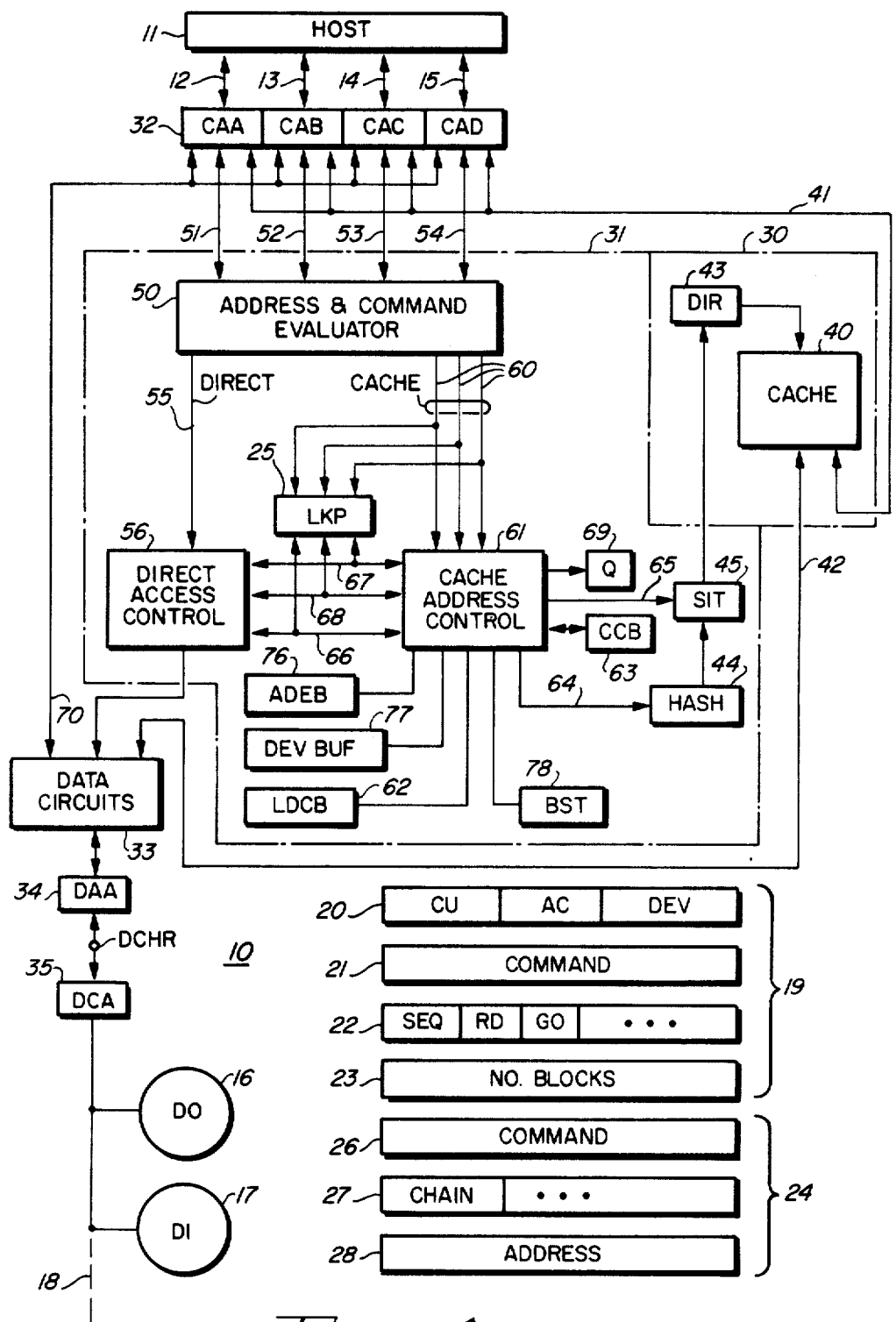
FIG. 1 is a logic diagram illustrating a peripheral memory system connected to a host which incorporates the present invention. Also shown are channel command words and internal command words used in connection with practicing the invention.

Referring now more particularly to the drawing, like numerals indicate like parts and structural features in the various diagrams. A hierarchical peripheral storage or memory system 10 is attached to a host 11 for receiving from a host 11 for storage and supplying stored data signals to a host 11. In a typical application of storage system 10, host 11 consists of a central processing unit (CPU). In other variations, host 11 can be a virtual machine, a set of virtual machines running on a hardware CPU, and the like. Host 11 may also be a multi-processor, a uni-processor with attached processors and the like. While the invention can be applied to a great variety of storage systems 10, the preferred and illustrated embodiment shows a paging peripheral storage system for handling paging and swapping data sets. Generally, such paging and swapping data sets relate to storage of program data sets for a host 11. As such, storage system 10 is attached to a single host while a general application peripheral storage system can be attached to a plurality of hosts. The invention can be applied to either type of peripheral storage system.

Communications between the paging storage system 10 and host 11 is via a plurality of input/output connections 12–15 constructed in accordance with the input-/output peripheral channels of the IBM 370 series of computers available from International Business Machines Corporation, Armonk, N.Y. Such input/output connections, commonly referred to as channels and subchannels, are so well known, their description is not necessary. Storage system 10 has a lower or backing storage portion consisting of a plurality of direct access storage devices (DASD) 16–18 and separately enumerated D0, D1, . . . All accessing of data storage areas of storage system 10 by host 11 is by addressing the DASDs 16–18. This addressing is achieved by using the architecture of the input/output connections 12–15 which are summarized in a set of logic blocks 19. Logic blocks 19 represent a channel command word (CCW) as used in the channels for the IBM input/output connections. Typically, each channel command word 19 includes an address byte 20. Each address byte 20 includes a plurality of bits for designating the control unit (CU) which is to receive the command. A second plurality of bits DEV uniquely identify the devices 16–18 to be accessed. In a paging and swapping peripheral storage system 10, each of the devices 16–18 is provided with a plurality of logical device addresses, i.e., device D0 for example can be addressed by any one of four addresses. Such multiple addressing has been practiced in the IBM 2305 paging storage system to a limited degree. The logical addresses for each device are indicated in the bits AC of address byte 20. AC has two bits for indicating which of the four logical addresses are being used by host 11 to address a device D0. In the presently constructed embodiment, one of the logical addresses 00 designates a direct access to devices 16-18 (cache bypass). That is, host 11 operates with devices 16-18 as if peripheral storage system 10 were not a hierarchical system. For the AC bits being equal to 01 10 or 11, the hierarchy, later described, is accessed for obtaining data from devices 16-18 or supplying data to those devices such that the apparent performance of those devices is enhanced on those three logical device addresses. The abbreviation AC indicates the access path (logical) to the device indicated by bits DEV.

A second byte of CCW 19 is command byte 21 which contains a code permutation signifying to peripheral memory system 10 what function is to be performed. A third byte 22 is a command modifier byte having a plurality of control fields which electrically indicate to peripheral memory system 10 various modes of operation for executing the command indicated in byte 21. Of interest to the present invention is the bit pattern SEQ in which host 11 indicates to peripheral memory system 10 that the data to be transferred in an upcoming set of transfers will be sequential data. When SEQ portion of byte 22 indicates sequential data, then the additional command modifier byte 23 is included in the CCW 19 for indicating the number of blocks or segments of data which will be transferred from devices 16-18 to host 11, or in the reverse direction, as a sequential set of data. Such sequential sets of data in a paging environment are often referred to as swapping data sets. Additionally, byte 22 can indicate read and discard in section RD which means that once host 11 obtains data from the hierarchy, that the data stored in the hierarchy cache can be discarded; the data stored in the devices 16-18 is retained. Further, controls are provided by so-called "guest operating system" GO. In a virtual computer environment for host 11, one of the operating systems can have cognizance of the paging peripheral memory system 10. Access to peripheral memory system 10 can be handed over to another operating system for reading or storing data. Such other operating system is a guest of the first operating system and, hence, is not allowed to modify certain control aspects of the peripheral memory system. Other control fields are also used within byte 22 which are beyond the present description.

The hierarchy includes a system storage 30 of the semiconductor random access type which has a portion 40 designated as a cache for devices 16-18. Caching principles are sufficiently well known that the purposes and intents of cache 40, with respect to devices 16-18, need not be detailed. A control 31 receives the peripheral commands from host 11 for accessing devices 16-18 through one of the logical device addresses AC as well as providing access to cache 40 based upon the other three logical device addresses of AC. Data is transferred automatically by peripheral memory system 10 between cache 40 and devices 16-18. This transfer is achieved using the same principles of transfer as between host 11 and devices 16. That is, host 11 accesses devices 16-18 in a direct mode (AC=00) via channel adaptors 32, individually denominated CAA, CAB, CAC and CAD, then over bus 55 through direct access control 56, data circuits 33, device adaptor 34 and device control attachment DCA 35. Received CCWs 19 are interpreted by control 31 for determining the direction of data flow between host 11 and devices 16-18 as well as other functions, as is well known, for controlling this type of storage apparatus. The relationships of cache 40 to devices 16-18 is substantially identical to the relationships between host 11 and devices 16-18. That is, while host 11 provides control via a series of CCWs 19, the control 31 provides access between cache 40 and devices 16-18 by using a plurality of internal control words (ICW) which are structured in a similar manner to the CCWs, as will become apparent. Certain efficiencies in data transfer operations can be provided by altering the ICWs 24 with respect to the CCWs 19. Instead of going through channel adaptors 32, control 31 has CACHE ACCESS CONTROL CAC 61 which operates system storage 30 and provides access to devices 16-18 through DIRECT ACCESS CONTROL DAC 56 using ICWs 24. Instead of channel adaptors 32, a linkage port LKP 25 provides for transfers between CAC 61 and DAC 56. LKP 25 is described later with respect to FIG. 3.

Each ICW 24 includes a command byte 26 corresponding to command byte 21. It should be appreciated that the code permutations for identical commands are the same. Some additional commands are provided while some of the commands for byte 21 are dispensed with. A command modifier byte 27 includes a chain control bit "CHAIN" which replaces the chaining indication normally provided by host 11 to control 31 via channel adaptors 32. (The chaining indication by host 11 is the supplying of a SUPPRESS OUT tag signal.) When final status is reported by peripheral memory system 10 to host 11; the SUPPRESS OUT indication of chaining, i.e., an indication of a series of closely-related peripheral commands, as is fully described and used in connection with the input/output connections 12-15, is removed. The removal indicates chaining is being terminated. Since CAC 61 does not use tag signals, command modifier bye 27 is used to replace that tag control signal. The bytes 28 of each ICW 24 point to the stored location of the address of the devices 16-18, which are to be accessed. No logical addresses are used in the ICWs. In fact, control 31 converts all of the logical addresses directed to the hierarchy into bits DEV. Address bytes 28 not only point to the stored location of DEV but also point to the device cylinder address (C), the device head or track address (H) and the record address (R) within a record track.

The record address corresponds to a SECTOR address used in addressing most disk storage apparatus. In a preferred embodiment, four records are provided on a single track (H address); hence the record address is 1, 2, 3 or 4 corresponding to an effective orientation of 0°, 90°, 180° and 270° of the disk with respect to its reference rotational point. Design parameters may dictate actual rotational orientations that may differ from the orthogonal orientations.

Figure 2:
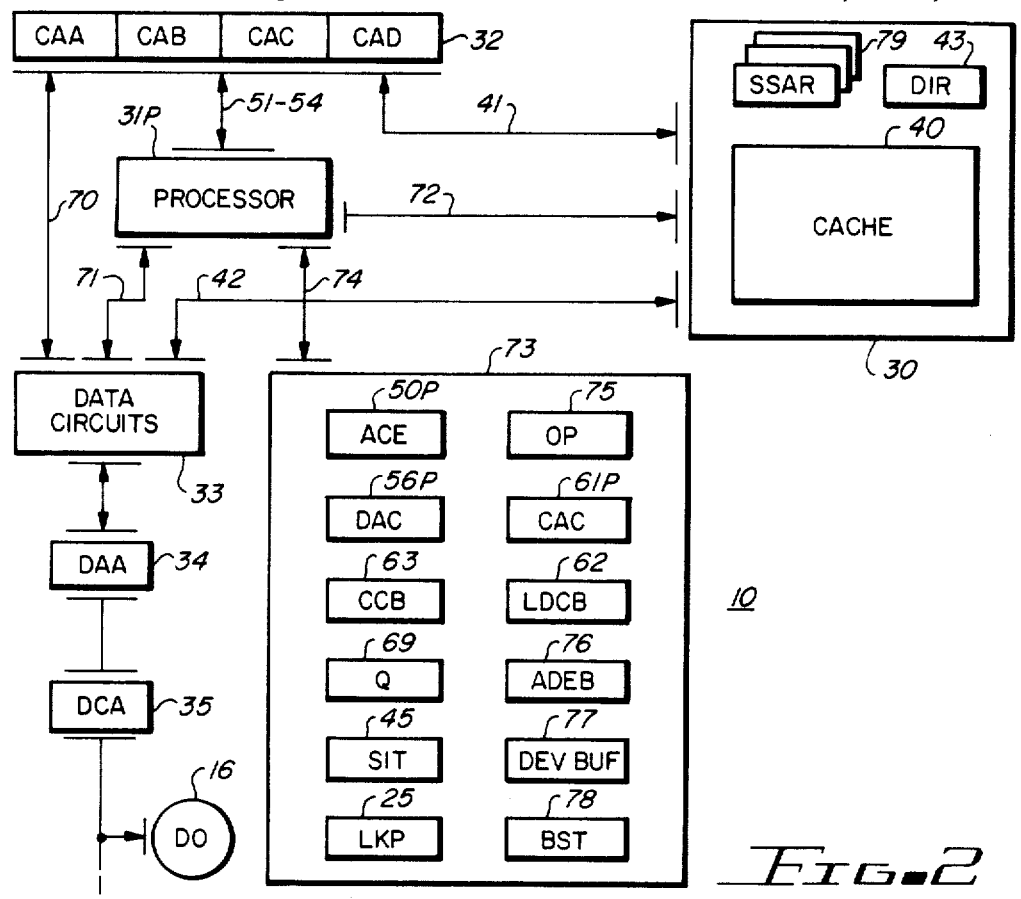
FIG. 2 is a logic block diagram of a preferred implementation of the FIG. 1 illustrated system employing a programmed processor for controlling the peripheral memory system.

Cache 40 transfers data signals through channel adaptors 32 with host 11 via bus 41 (FIG. 2). In a similar manner, data signals are transferred between devices 16-18 through data circuits 33 to cache 40 via bus 42. When simultaneous transfers between cache 40 and host 11 or DASDs 16-18 are not desired, buses 41 and 42 are combined into a single bus time shared by the data transfers. Accessing cache 40, which can be a relatively large memory (several megabytes), requires CAC 61 to transfer the device address together with the cylinder and record addresses CHR over bus 64 to hash circuit 44.

Hash circuit 44, which may be microcode implemented, converts the DASD address into a hash class indicator. Since the storage capacity of cache 40 is much less than devices 16-18, the address range of devices 16-18 are concentrated into classes called hash classes for ease of access. A scatter index table SIT 45 has one register for each of the classes defined by has circuit 44. The contents of the registers in SIT 45 are address pointers to a directory DIR 43 which contains the address DCHR used to access a device 16-18. When data is stored in cache 40, the DASD 16-18 DCHR address together with the cache 40 address is stored in a so-called entry of DIR 43. Since a plurality of device 16-18 addresses correspond to one hash class, a singly-linked hash class list is provided in the entries of DIR 43 such that scanning cache 40 using hashing only requires scanning the entries within a given hash class. Based upon the contents of directory 43, cache 40 is accessed using known techniques. If no related entries are found in directory 43, then a cache miss occurs requiring CAC 61 to either allocate space in cache 40 for receiving data from host 11 or to transfer data from devices 16-18 using ICWs 24 and linkage port LKP 25.

Control 31 includes the usual portion of control units that attach to hosts. For example, ADDRESS AND COMMAND EVALUATOR ACE 50 communicates with channel adaptors 32 via buses 51, 52, 53 and 54 for receiving command signals from host 11 and supplying status signals to host 11. ACE 50 evaluates CCWs 19 and instructs the peripheral memory system 10 to perform the commanded function as well as indicating the chaining conditions and receiving status signals from the other portions of the peripheral system for relaying to host 11. In a direct mode, i.e. AC=00, ACE 50 supplies command signals over bus 55 to DAC 56 such that data signals can be transferred between data circuits 33 and the appropriate channel adaptor 32 using known DASD peripheral storage device techniques. In executing its functions, DAC 56 exercises control over data circuit 33 in the usual manner.

Of importance to the present description is the operation of the hierarchy such that sequential data sets can be stored in cache 40 using a minimal size cache with minimal allocation controls while maintaining sequentiality in an efficient manner and maintaining a sufficient number of the data blocks in cache to satisfy the operating requirements of a host 11. ACE 50, when receiving a logical device address in byte 20, indicating desired access to the cache, supplies the received command signals over one of the three buses 60 to CAC 61. The three buses are logical buses indicating the respective three cache 40 accesses. CAC 61 stores the received command and modifier data in a channel control block register 63, one register for each of the logical devices. Remember there are three logical device addresses for each of the devices. Therefore, if there are eight devices 16-18 then there will be 24 block registers 63 in LDCB 62.

The identification and operational status of each LOGICAL device is kept in a respective one of logical DEVICE CONTROL BLOCK registers in LDCB 62. Access to the logical device, which is represented by allocation of registers in cache 40 to the address indicated in fields AC and DEV of byte 20, is via address bus 64 to hash circuit 44. In certain situations for sequential data, sequential addresses for devices 16-18 (CHR portion) successive registers in SIT 45 can be accessed. Accordingly, CAC 61 accesses SIT 45 via bus 65 to avoid the delay in hash circuit 44. This operation enhances the response of peripheral memory system 10 to a host 11 when sequential data is being processed. When CAC 61 receives a miss indication from searching the hash class of DIR 43, a request for a data transfer from devices 16-18 to cache 40 is supplied over bus 66 to DAC 56 via LKP 25. The bus 66 signal alerts DAC 56 to the request and indicates the ICWs are addressable via LKP 25. In the preferred microcode embodiment, LKP 25 is a microcode linkage port, as will become apparent. DAC 56 responds to the ICWs 24 in the same manner that it responds to the CCWs 19. Upon completion of the data transfers, as requested through LKP 25, DAC 56 supplies status signals over bus 67 to CAC 61. At that time, cache 40 is storing data that is available to host 11. Further communications between CAC 61 and DAC 56 are via bus 68, all such communications include storing message data in LKP 25. Because devices 16-18 are accessed through a plurality of logical device addresses, a set of queuing registers 69 queue device-related operations requested by CAC 61. In this manner, DAC 56 may not be concerned with the queuing requests through the logical devices but can operate in a direct-access DASD mode for either host 11 and for the CAC 61. Therefore, DAC 56 can be used in connection with the hierarchy cache, and can be used in those peripheral storage systems not employing a cache.

CAC 61 also includes additional controls. For example, register ADEB 76 contains one entry of directory 43 with which CAC 61 is currently operating. That is, the address of a device 16-18 resulted in a hit of cache 40 or a portion of cache 40 was allocated for data to be supplied by host 11. By placing the associated directory entry in register ADEB 76, operation of CAC 61 is enhanced. Directory 43 is a part of system storage 30; by placing the active directory entry in ADEB 76, system storage 30 is free to transfer data over buses 41 and 42 independent of control 31. Device buffer (DEV BUF) registers 77 contain control information relating to a device 16-18 and are used by CAC 61 in setting up accesses through DAC 56. Such registers are found in a writable control store 73 in the microcoded implementation of the invention. Buffer 77 is merely an allocated portion of control store 73 with no designated data structure. BST 78 is a buffer sequence table described later with respect to FIG. 3 and used in connection with practicing the present invention within the illustrated peripheral memory system 10. It includes pointers to directory 43 for each of the data blocks to be transferred in a sequence of data blocks over bus 42 as well as having a scanning control mechanism for determining which directory index is to be used for accessing cache 40 during a sequential data transfer. In this manner, a sequential data transfer can dispense with addressing setups enabling transferring a burst of data blocks from a device 16-18 without interruption, as will become apparent.

FIG. 2 is a block diagram of a preferred embodiment of the FIG. 1 illustrated system which employs a programmed microprocessor 31P corresponding to control 31. Bus 70 extends from channel adaptors 32 to data circuits 33 and operates in an identical manner as shown in FIG. 1. Buses 41 and 42 extend respectively from channel adaptors 32 and data circuits 33 to system storage 30. Buses 41 and 42 may be combined into one bus with data transfers time sharing the single bus. Processor 31P in controlling the data transfer between data circuits 33 and system storage 30 provides control signals over bus 71 to circuits 33 plus address and sequencing control signals over bus 72 to system storage 30. A plurality of system storage address registers SSAR 79 provide addresses to system storage 30. For example, eight or sixteen SSARs 79 may be provided. Therefore, when processor 31P accesses system storage 30, not only does it give the address of the system storage 30 to an SSAR 79 but indicates which of the SSARs is to be used in accessing the storage. Multiplex addressing registers to a memory are known and therefore not further described.

In practicing the present invention, processor 31P primes system storage 30 by loading the addresses of cache 40 (a portion of subsystem storage 30) within an SSAR 79, such that the cache addresses need not be loaded in SSARs 79 intermediate the successive sequential blocks. Therefore, during the ensuing sequential data transfer, for each data block to be transferred into cache 40, processor 31P merely activates to an SSAR 20 for initiating the transfer of data signals between cache 40 and a device 16-18. SSARs 79 are separate electronic registers outside the memory array of system storage 30. Processor 31P communicates with channel adaptors 32 over a single bus denominated as 51-54.

Operation of processor 31P is in accordance with microcode programs stored in a control store 73 which is preferably writable; a portion can be writable while another portion containing certain programs can be read-only. Bus 74 couples the processor 31P to control store 73. Within control store 73 are programs ACE 50P which implement the function of ADDRESS AND COMMAND EVALUATOR 50, DAC program 56P which are programs implementing the function of DIRECT ACCESS CONTROL 56, CAC program 61P which implements the functions of CACHE ACCESS CONTROL 61 or OP programs 75 which are other programs necessary for operation of the storage system 10 but which are not necessary to an understanding of the present invention. The registers used by processor 31P to control the system 10 via the programs 50P, 56P and 61P include CCB 63, LDCB 62, queue registers 69, ADEB 76, SIT 45, buffer 77, LKP 25 and BST 78. For an extremely large cache 40, SIT 45 can be stored in system storage 30. To enhance performance, a set of registers for containing a page of SIT 45 can be reserved in control store 73.

Figure 3:
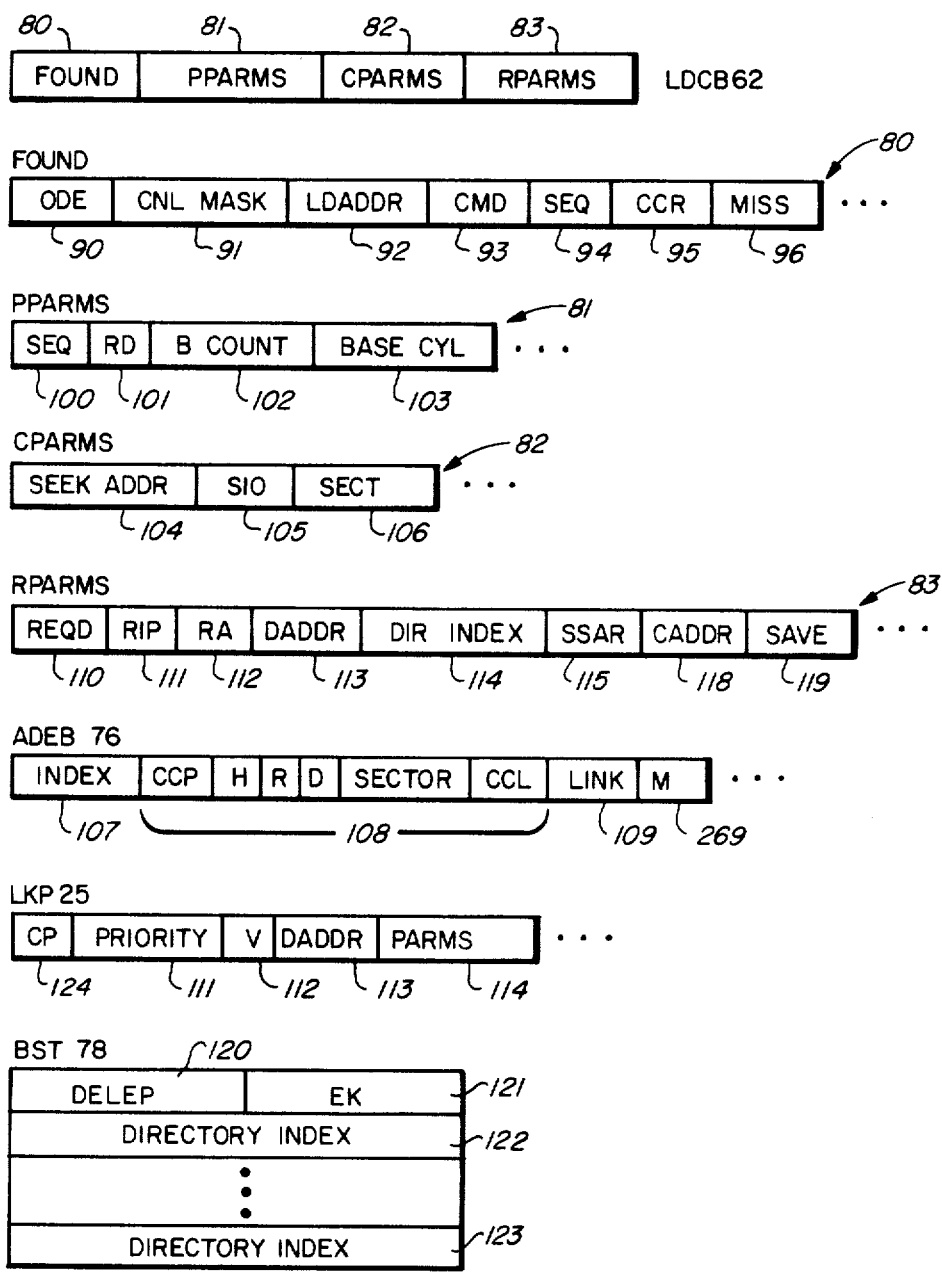
FIG. 3 illustrates various data structures used in connection with the operation of the FIGS. 1 and 2 illustrated peripheral memory system.

Operation of the FIG. 2 illustrated preferred embodiment is best understood by reference to FIGS. 3 through 9 which illustrate the data structures in detail as well as logic flow diagrams for the microcode portions necessary for an understanding of the present invention. FIG. 3 illustrates the data structures used by a processor 31P to operate peripheral memory system 10 in accordance with the invention. LDCB 62 is a series of registers containing data signals in control store 73 consisting of four sections. A first section 80 is a so-called FOUNDATION data structure which defines and supports the functions of peripheral memory system 10 in a general operational sense. PPARMS 81 is that portion of LDCB 62 relating to the parameters defining a paging and swapping function established through the later described SET PAGING PARAMETERS command. CPARMS 82 contain the command parameters such as SET SECTOR, SEEK, SEARCH ID, received by system 10 in commands issued by host 11. These issued commands are those used in connection with known disk storage apparatus peripheral storage systems.

RPARMS 83 contain the parameters for supporting read activity; i.e., transferring data signals from devices 16-18 to cache 40.

The FOUNDATION portion 80 includes a bit ODE 90 which signifies whether or not a DEVICE END (DE) is owed by peripheral storage system 10 to host 12. CNL mask 91 contains a bit pattern indicating which channel adaptor 32 received the current command, i.e. which channel the logical device has an affinity to. LDADDR 92 contains a code permutation indicating a logical address received with the command, i.e., the bit patterns of AC and DEV of byte 20 in FIG. 1. CMD 93 contains the code permutation from byte 21 of FIG. 1. SEQ 94 contains the contents of SEQ section of byte 22 of FIG. 1. CCR 95 indicates whether a CHANNEL COMMAND RETRY has been sent to host 11 by system 10. In this regard, when a cache miss is indicated in section 96, CHANNEL COMMAND RETRY is sent to host 11. Therefore, LDCB 62 signifies when a cache miss has occurred for cache 40 and whether or not system 10 has supplied the appropriate CCR signal. CHANNEL COMMAND RETRY signifies to host 11 that a delay in executing the peripheral command is required. System 10 upon reaching a state in which the command can be executed will send a DEVICE END (DE) signal to the host. The host then sends the peripheral command for the second time for execution by memory system 10.

PPARMS 81 include SEQUENTIAL bit 100 corresponding to the SEQUENTIAL bit SEQ in byte 22 as well as RD indicator 101 from RD section of byte 22. B COUNT 102 contains the number of blocks indicated in byte 23. As each block of the sequential data is transferred to host 11, B COUNT 102 is decremented by one. Therefore, it indicates the number of blocks yet to be transmitted to host 11 through cache 40. BASE CYL 103 contains the cylinder address C from which the sequential data will be transmitted from devices 16-18, i.e. in a multicylinder request BASE CYL 103 contains the value C of a virtual machine (VM) minidisk.

CPARMS 82 contain the DASD SEEK address in SEEK ADDR 104, the last or current SEARCH ID argument in SID 105 and the last or current SET SECTOR value in SECT 106.

RPARMS 83 include REQD 110 indicating that a data transfer from a device 16-18 to cache 40 is required. RIP 111 indicates that a read is in progress from a device 16-18 to cache 40. RA 112 indicates that a read has been completed from a device 16-18 and that certain postprocessing functions are being performed. DADDR 113 contains the bit pattern of DEV from byte 20 (FIG. 1) for indicating the device 16-18 being addressed. DIR INDEX 114 contains a directory 43 index value for indicating which directory 43 entry register contains the entry corresponding to the logical device identified in the LDCB 62 register. SSAR 115 identifies which SSAR 79 will be used in accessing cache 40 in a data transfer between a device 16-18 and cache 40. CADDR 118 stores the cache 40 address to be used in the read operation. SAVE 119 indicates an area of the LDCB 62 registers which processor 31P uses to save control data signals during various operations, including interruption operations.

ADEB 76 is structured in the same way that each entry of directory 43 is structured. Accordingly, description of ADEB 76 is a description of directory 43. In each entry of directory 43 as well as ADEB 76, INDEX 107 is the logical address of the directory entry. This field contains self identifying data for each entry. Section 108 contains the address of devices 16–18 corresponding to the data stored in cache or allocated for storage of data. CCP is the physical cylinder address, i.e., the actual physical address of the cylinder for a device 16–18, H is the head address, R is the record address, D is the device address bit pattern corresponding to DEV section of byte 20, SECTOR is the actual sector value, i.e., rotational position of the disk from which reading will begin. The R value for tracks having four records can vary from one to four while the sector value is the actual sector address. In addressing DASD, the R value is translated into a rotational position indicator at the byte level using usual DASD addressing techniques. The R value in some host operating systems can range from 1–120 or other numbers; in such cases the larger R values are reduced to a value modulo the number of records N in a track. Then the R value, modulo N, is converted to a rotational address of the disk. Such sector value is suitable for initiating access to a record with a minimal latency delay. CCL is the logical cylinder address, such as provided for logical devices defined for the physical devices. LINK 109 contains the data signal code permutation of the singly-linked list for linking all entries of a hash class together. The last entry of a given has class will have a particular code pattern (zeroes) indicating end of chain or end of class. M bit 269 indicates whether or not the data in cache 40 has been modified since it was received from a device 16–18. Other code permutations can be added to each directory 43 entry and which are not pertinent to an understanding of the present invention. For example, an MRU-LRU list may be included in each entry.

LKP 25 is an area in control store 73 accessible by programs ACE 50P, DAC 56P and CAC 61P which make up a linkage port or message area for controlling the interaction of the execution of these microcode programs. In one embodiment, ACE 50P and DAC 56P were treated as one microcode segment. In any event, the structure of the port includes a code point CP 124 which identifies the portion of the microcode which lodged the control data in the port. That is when CAC 61P lodges an entry in LKP 25, DAC 56P fetches the control data and executes the function. Then when DAC 56P enters new data in LKP 25 responding to the request by CAC 61P, CP 124 indicates the CAC 61P which point in microcode execution the DAC 56P relates to therefore can continue processing based upon DAC 56P response. Priority section 125 contains code permutations indicating whether the request lodged in LKP 25 is high priority, low priority or a continued processing indication. V bit 126 indicates whether or not LKP 25 entry is valid, i.e. is it a recent entry requiring action. DADDR section 127 contains the DEV code permutations from byte 20 for identifying which device 16–18 is associated with the current LKP 25 control data signals. PARMS 128 contain various parameters associated with the message, i.e. what function is to be performed, status and the like.

BST 78 has a set of registers for each of the devices 16–18. A first register includes section DELEP 120 which contains an index value of 1 to 8 pointing to the directory indices 122–123. These indices identify the directory entries to be deleted. EK 121 contains a count of the number of valid entries in the table. It is also used as an address, for example the first directory pointer index is always stored in 122 while the 8th one is always stored at 123. For a value of 3 in EK 121, a third directory index is accessed. Directory index, remember, is a logical address of a directory 43 entry, hence is a rapid access into directory 43.

Figure 5:
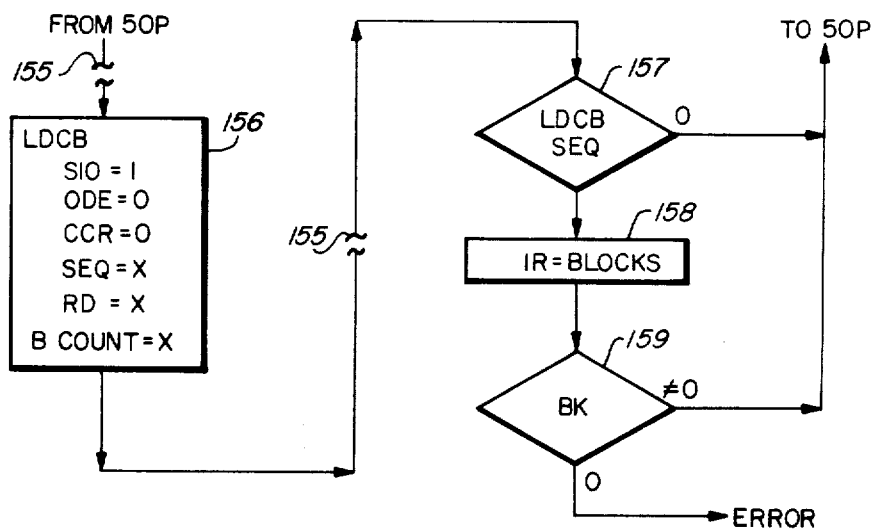
FIG. 5 is a logic flow diagram showing execution of a set paging parameter command by the FIGS. 1 and 2 illustrated peripheral memory system.
Figure 4:
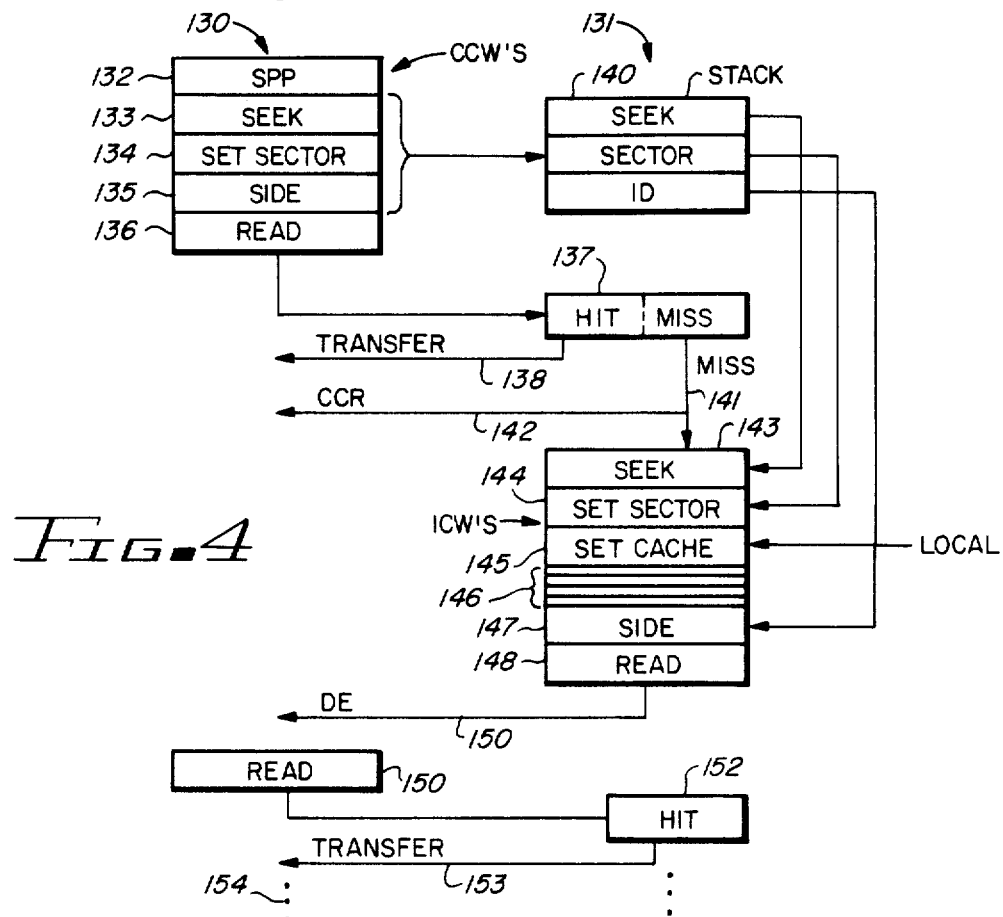
FIG. 4 diagramatically illustrates a mode of operation of the FIGS. 1 and 2 illustrated peripheral memory system employing channel command words and internal command words.

FIG. 4 illustrates a sequence of CCWs and ICWs in a read or write data transfer. A read transfer transfers signals from a device 16–18 to host 11, while a write transfer is a data transfer in the reverse direction. A chain of CCWs 130 begins with SET PAGING PARAMETERS (SPP) CCW 132. FIG. 5 illustrates the execution of such a command by storage system 10. Fundamentally, SPP 132 sets whether or not sequential data is to be transferred from the peripheral storage system 10 to host 11 as well as other parameters identified in byte 22 of CCW 19 (FIG. 1). Once SPP has indicated parameters of operation to system 10, a SEEK CCW 133 results in a SEEK command being transferred to the peripheral memory system; in one embodiment the seek parameters were embedded in the SPP command. Using normal DASD architecture, SEEK is followed by SET SECTOR CCW 134 which in turn is followed by a SEARCH ID equal (SIDE) CCW 135. Now the storage system is ready to read data from an addressed device 16–18 by READ CCW 136. Upon receipt of a READ command, peripheral memory system 10 performs the actions indicated in column 131. First of all, the SEEK, SET SECTOR and SEARCH ID commands are stacked as at 140. At 137 a directory 43 search, as explained with respect to FIG. 1, is conducted. For a cache hit, i.e., the requested data is in cache 40, the data is immediately transferred as indicated by arrow 138 from cache 40 to host 11 via the channel adaptor 32 which received the host-supplied command. On the other hand, if directory 43 indicated the data was not in the cache, then a cache miss has occurred, as indicated at arrow 141. A CHANNEL COMMAND RETRY (CCR) is supplied by system 10 as indicated by arrow 142. This CCR tells host 11 that when a DEVICE END signal is received from system 10, that the last READ CCW 136 must be reexecuted by the channel by sending the same READ command to system 10. While these actions are occurring, system 10 constructs a chain of ICWs 143–148 beginning with a SEEK ICW 143 which is derived from the stacked SEEK commands received from host 11. For a multi-track operation, the ICWs are derived from SEARCH ID parameters. The SEEK ICW 143 is followed by a SET SECTOR ICW 144 which has the sector calculated from the record number. At 145, the local system 10 input results in a SET CACHE ICW 145. This ICW causes DAC 56P to insert into the appropriate SSAR 79 the address of system storage 30 at which the data to be read will be stored. If a plurality of blocks of data are to be transferred, then a plurality of SET CACHE ICWs occur as indicated by numeral 146. Then a SEARCH ID EQUAL ICW 147 corresponding to the SIDE CCW 135 occurs. The SEARCH ID EQUAL ICW 147 corresponds to the first SET CACHE ICW 145. This means a plurality of blocks of data are read in sequence using but one SIDE ICW 147. Then a number of READ ICWs 148 equal to the number of data blocks to be transferred are given to DAC 56P for reading a predetermined number of blocks of data indicated by the number of SET CACHE ICWs. Upon completion of the read operation, which transfers data from the addressed device 16–18 to cache 40 at the addresses set in SSARs 97, system 10 supplies a DEVICE END (DE), as indicated by arrow 150, to host 11. Host 11 immediately responds by reissuing a peripheral command at 151 corresponding to the CCW 136. System 10 searches directory 43 at 152 resulting in a cache hit because of the just-executed ICW chain. The requested data is then transferred from cache 40 to host 11 as indicated by arrow 153. In the event that the data was not transferred for the requested data block at 136, another cache miss will occur and an error status will be reported to host 11. This error status reflects the fact that system 10 was unable to transfer data from the addressed device 16-18 at the indicated cylinder and head address. Host 11 then can use the direct access (AC=00) for attempting recovery using standard disk storage apparatus recovery techniques beyond the scope of the present description. Ellipsis 154 indicates that the above-described operation is highly repetitive as well as indicating that various CCW chains for various devices 16-18 can be interleaved. The ICW chains do not necessarily follow the sequence of chains of CCWs. Depending upon the circumstances, an ICW chain may be constructed and used by a later occurring CCW chain. Such possibility indicates the asynchronous aspect of the ICW chains with respect to the CCW chains. Usually, the first CCW chain will result in a first occurring ICW chain. At any instant, a separate ICW chain can be active for each device 16-18.

FIG. 5 illustrates the execution by system 10 of the SPP command. ACE 50P receives and decodes the SPP command. As a result of that decoding, processor 31P activates CAC 61P. Upon activation, processor 31P via CAC 61P performs certain nonpertinent logic functions at 155. Then at 156, LDCB 62 (FIG. 3) is accessed for setting SIO 105 in CPARMS 82 to unity, setting ODE 90 in FOUNDATION section 80 to 0, setting CCR bit 95 to 0, setting SEQ 100 to the value received in byte 22 (indicated by X), setting RD section 101 to the value in RD section of byte 22 and setting B COUNT 102 of PPARMS 81 to the value indicated in received byte 23. Following setting LDCB 62, processor 31P performs some nonpertinent logic functions at 155. Then processor 31P at 157 examines LDCB 62 section SEQ 100 to see if sequential data is involved. If not, processor 31P returns to ACE 50P via LKP 25. If sequential data is indicated, processor 31P at 158 transfers the number of blocks indicated in B COUNT 102 to an internal register IR (not shown) of processor 31P. In the illustrated embodiment a maximum of eight blocks can be transferred in a given burst of data blocks. In this embodiment, when B COUNT is greater than or equal to eight, eight blocks are transferred and B COUNT is reduced by eight. For any B COUNT less than eight, a number of blocks equal to B COUNT are transferred. Then at 159, the value of the block count is examined. If it is nonzero, then an appropriate SPP command execution has occurred. If the block count is 0, then the sequential indicator or the block count is 0, then the sequential indicator or the block count must be in error. Accordingly, processor 31P leaves step 159 to go to an error status reporting procedure beyond the scope of the present description.

Figure 6:
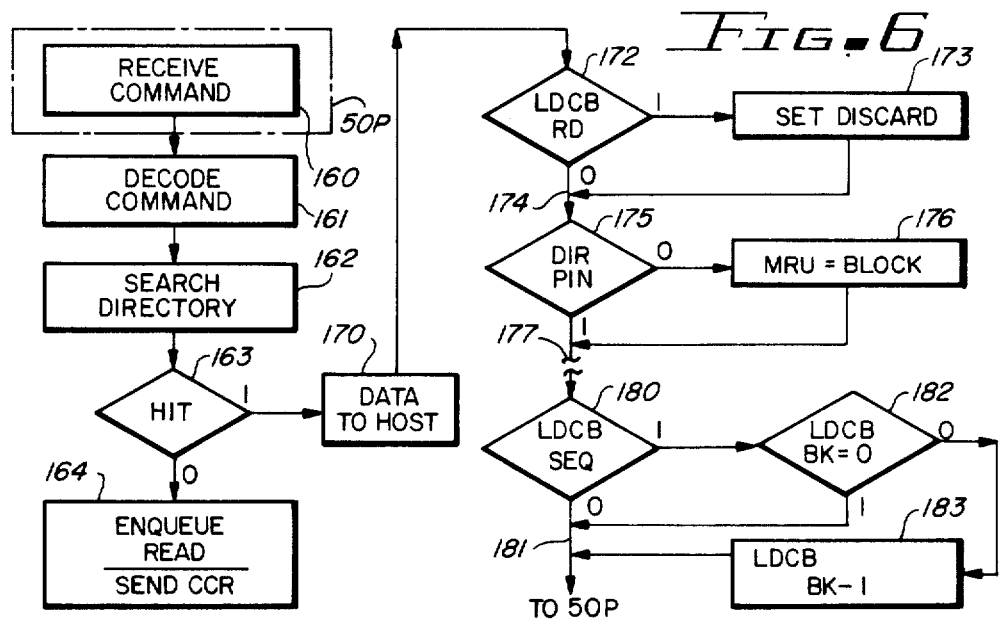
FIG. 6 is a logic flow diagram showing execution of a read command together with a cache hit logic flow for the FIGS. 1 and 2 illustrated peripheral memory system.

The SEEK, SET SECTOR, and SIDE CCWs 133-135 are not described since they are well known. A change in system 10 operation from the prior art occurs upon the receipt of a READ command based on READ CCW 136 for sequential data. FIG. 6 illustrates the machine operations for transferring sequential data. At 160 the received command is processed by ACE 50P. Then through LKP 25, CAC 61P is activated by processor 31P. The command is again decoded at 161.

Since it is a READ command, directory 43 is searched at 162 as described with respect to FIG. 1. At 163 processor 31P determines whether or not the directory search resulted in a cache hit or miss. For a cache miss, the received command is enqueued at 164 by placing the command and its control information in queue registers 69. A CCR is sent to host 11. Since queue registers 69 can use any format they are not further described except to say that the queue is a first-in first-out queue for each of the addressable devices, i.e., for eight devices 16-18 there are eight queues. The importance of having a FIFO queue is to ensure that the sequence of responses to the host for a given device corresponds to the sequence of commands sent by the host. From queue 69, CAC 61P initiates a read operation for addressed device 16-18, as explained with respect to FIGS. 7-9.

A cache hit condition in the directory search at 163 results at 170 in cache 40 automatically transferring data to host 11 via the appropriate channel adaptor 32. Such automatic cache to host transfers are well known and not described for that reason. During the automatic data transfer an error can occur; accordingly, upon an error detection, processor 31P goes to an error reporting and analyzing routine at 171. Generally the data transfers will be error free. At 172, following the successful completion of a data transfer, processor 31P accesses LDCB 62 to examine RD section 101. If discard after read is indicated (RD=1), processor 31P sets the just read block of data cached for destage if modified; and free, if not modified. Destaging is performed by processor 31P when no commands are being executed. Destaging the data prior to requirement of a replacement algorithm being invoked reduces the control required for efficiently managing cache 40, i.e. free spaces are made available before they are needed. Then through logic path 174, from either steps 172 or 173, processor 31P at 175 determines from directory 43 in a field (not shown) whether or not the data is pinned to cache 40. Pinning data to cache 40 means that it cannot be transferred to devices 16-18 until a pinning flag (not shown) of directory 43 has been erased. If the data is not pinned to cache, then the block that was just read is made the most recently used (MRU) block at 176, in the LRU list (not shown) for the replacement algorithm. This action is achieved by accessing directory 43 and updating the least recently, used list of known design, in directory 43. At 177, nonpertinent logic steps are performed by processor 31P. Then at 180, LDCB 62 is again accessed for examination of SEQ 100. If sequential data has been indicated (SEQ=1), then processor 31P at 182 examines LDCB B COUNT 102 to see if the block count is equal to 0, i.e., is the just-transferred block the last block to be transferred in the sequence of data transfers. If it is not the last block transferred, then at 183 the block count (BK) is decremented by 1. Following steps 180, 182 or 183 logic path 181 leads processor 31P back to ACE 50P for performing final status reporting to host 11 in the usual manner.

Figure 7:
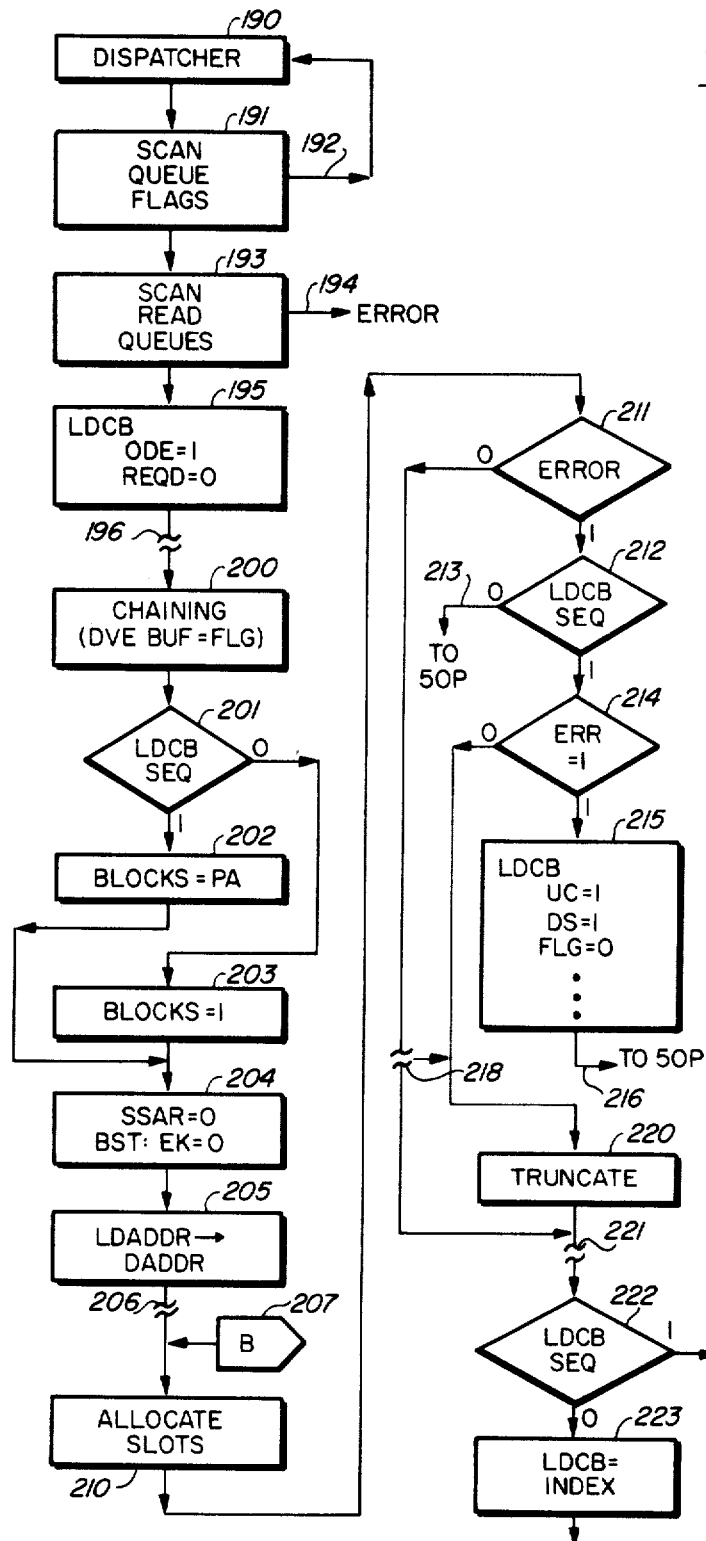
FIGS. 7 and 8 jointly show a logic flow diagram related to the promotion of sequential data from a backing store to a front or cache store including preparatory portions and internal command word portions for the FIGS. 1 and 2 illustrated peripheral memory system.
Figure 8:
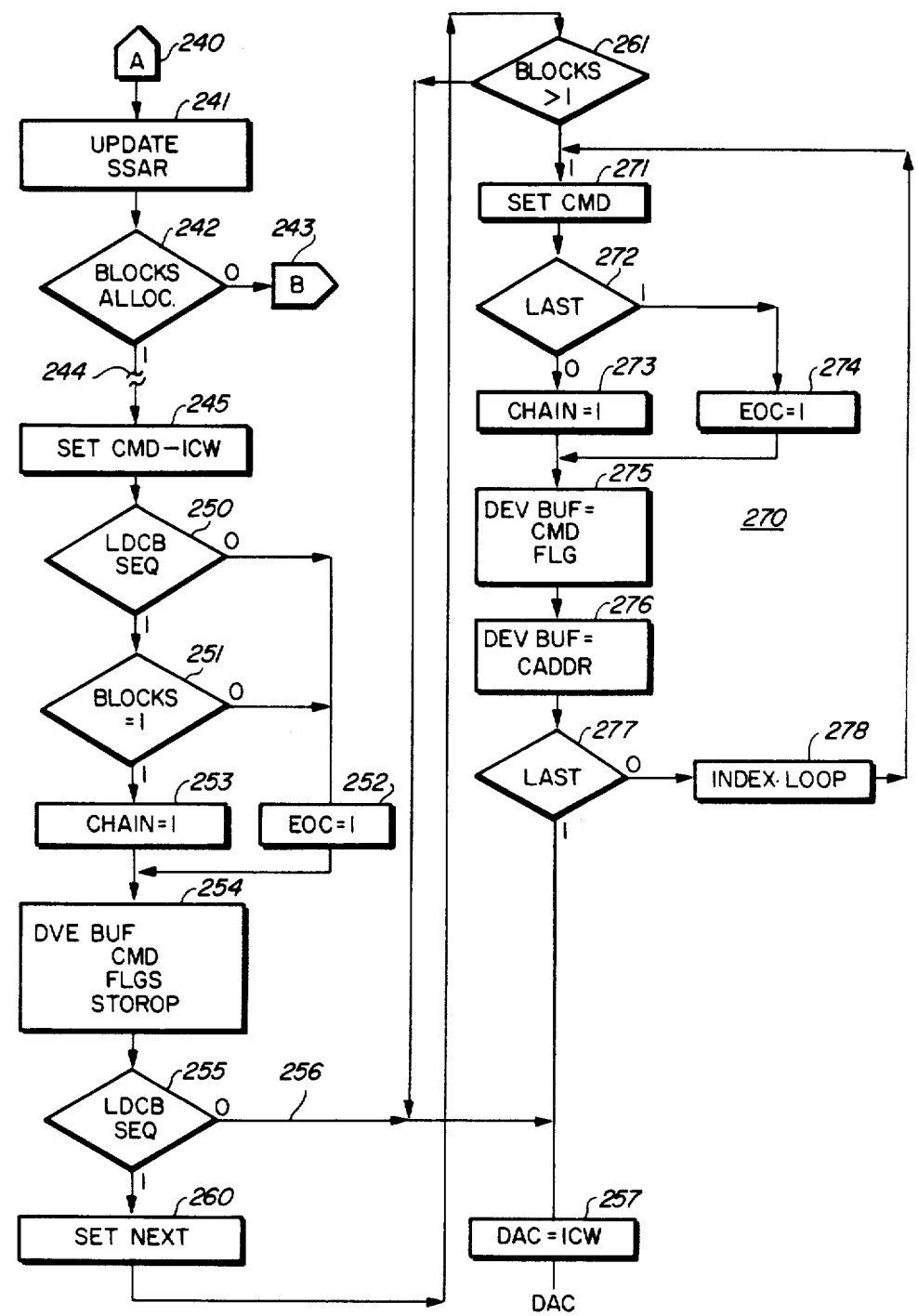

FIGS. 7 and 8 illustrate scanning the read queues in queue 69 and generating an ICW chain of internal system 10 commands. After the requested READ command has been enqueued, processor 31P causes system 10 to perform diverse functions, such as responding to commands received over various ones of the channel adaptors, additional commands received from the channel adaptor which had transferred the READ command (which was CCR'd). When there is a lull in receipt of peripheral commands from the host, SEEK and SET SECTOR device commands are sent to devices 16–18. When there is a lull in control activity, which may occur while cache 40 is transferring data to host 11, receiving data from host 11, transferring or receiving data from an addressed device 16–18, processor 31P through its dispatcher microcode, which is a portion of OP 75 (FIG. 2), scans its work tables, including queue registers 69. If the queues are empty, i.e., no reading is to occur, processor 31P follows logic path 192 returning to dispatcher 190. If a READ has been enqueued, as detected at 191 by scanning the queue flags, the queue entry is transferred at 193 from its queue register 69 to an internal register (not shown) of processor 31P. If an error occurs in this transfer, an error reporting and recovery technique is instituted at 194. Upon successful reading the queue entry from queue register 69, LDCB 62 is accessed at 195 to set ODE section 90 to unity to indicate that a DEVICE END is owed upon completion of a successful read (such as indicated in FIG. 5 by arrow 150). At 196 some nonpertinent functions are performed. Then at 200, in the device buffer area 77 corresponding to the addressed device, a bit is set to indicate that logical chaining will occur, i.e., more than one ICW will be used in the upcoming access to the addressed device 16–18. At 201, LDCB 62 is again accessed to examine the value of SEQ 100. For sequential data being indicated, processor 31P proceeds to 202 to set up the block count for the upcoming ICW chain equal to the paging parameters B COUNT 102 or eight, whichever is less, as limited in the illustrated embodiment.

A maximum number of blocks which can be transferred through a given ICW chain is equal to the number of SSARs 97. For example, for eight SSARs the number of blocks transferred will be a maximum of eight. Further, access delay (cylinder) boundaries are a consideration, for example, if the eight blocks to be transferred require accessing two cylinders; then only those blocks in the first cylinder will be transferred. For example, if the eight blocks have four blocks in a first cylinder and four blocks in a second cylinder, then the number of blocks would be set to four. This action minimizes the time required to transfer a series of blocks and enables all transfers to proceed to completion at electronic speeds. In the event of a cache miss on the first block of a given cylinder, then up to eight blocks are automatically transferred. Also the maximum number of blocks is never greater than the remaining value in B COUNT 102. The ICW chains are constructed such that cylinder boundaries are never crossed within any given ICW chain. These calculations follow usual computer programming techniques and are not described further for that reason. If sequential data is not indicated at 201, then the number of blocks to be transferred is set to one at 203. The number generated is supplied to the device buffer 77 along with the chaining flag, device addresses and other device control data. At 204, the SSAR 79 identification is set to zero. This means that processor 31P will access the SSAR having identification zero.

At 205, the address LDADDR, including AC and DEV from CCW 19 of FIG. 1, is converted to a physical device address. In the illustrated embodiment, this action is achieved by merely masking the AC portion from the logical address. Certain nonpertinent functions are performed at 206. Point 207 is reentry point B from a continuation of the logic flow diagram described with respect to FIG. 8, i.e., all of the logic steps from 190 through 206 are preparatory steps with the following described steps being repeatable as a loop for initiating a succession of block transfers.

The first step 210 in the loop allocates a slot or data space in cache 40. Usual allocation procedures are followed, i.e., an addressable unit (slot) on a so called free list (not shown) is identified as the slot to receive the first block of signals from the addressed device 16–18. That slot is then removed from the free list and identified within an internal register (not shown) within processor 31P for identifying which directory 43 entry is to be used for identifying the slot in cache 40. Note that there is one entry register in directory 43 for each addressable slot in cache 40. Accordingly, the actual address in cache 40 of the data can be derived directly from which registry of directory 43 contains the entry.

Upon the attempted allocation of the number of slots equal to the number of blocks set in steps 202 or 203, processor 31P at 211 determines whether or not any error occurred in the allocation process. If an error has occurred, the total number of blocks may not be successfully transferred from the address device 16–18 to cache 40. Accordingly, for an error condition, at 212 processor 31P examines LDCB 62 SEQ 100 to determine if the data transfer is a sequential transfer. If it is not a sequential transfer, processor 31P follows logic path 213 returning to ACE 50P to wait for a replacement algorithm control to make space available for one block. For a sequential transfer, processor 31P at 214 determines whether or not the error occurred on the first block to be transferred. If so, the entire operation will be aborted. Accordingly, at 215 LDCB 62 is accessed setting a UNIT CHECK (UC) flag (not shown) to unity, a DISCONNECT OWED status flag (DS) to unity and resets the other flags to zero. Then processor 31P returns via logic path 216 to ACE 50P. If the allocation error is not for the first block, then data transfers of the remaining blocks occur. Processor 31P follows path 217 to 220 for truncating the number of blocks to be transferred in the unallocated area from the ICW list.

Returning to step 211, if there were no allocation errors, then at 218 some nonpertinent functions are performed. These functions include analyzing microcode logic errors not related to allocation. If a slot was not allocated due to such microcode errors, then the truncate step 220 is also performed for reducing the number of blocks transferred from the addressed device 16–18 to cache 40. Without an error or after truncation, processor 31P performs some nonpertinent logic steps at 221. At 222, LDCB 62 SEQ 100 is examined. If SEQ is zero, i.e., nonsequential data, then at 223 the index of the directory 43 entry corresponding to the slot in cache 40 to receive the data is entered into LDCB 62 section 114 of RPARMS 83. For sequential data or after the index is entered into LDCB 62, at 224 the cache address to be inserted later into an SSAR 79 is generated from the directory index just inserted into LDCB 62. This generation is merely adding an offset to each of the directory indices. Then at 225, LDCB 62 SEQ 100 indicating sequential mode causes processor 31P to examine B COUNT 102 to see if the count is greater than one. If the count is greater than one, then at 232 processor 31P examines to see if the first block in the sequence of blocks being transferred is currently being handled. If not, at 233 a new cache address for the second block is provided. Then at 234 in the device buffer area 77, the SSAR 79 corresponding to the second or other blocks is set to the cache address, flags are set, pointer to the directory 43 is set and the SSAR 79 to receive the cache address is identified. Other functions to be performed may also be defined in the device buffer 77.

Returning to steps 225, 231 and 232, the logic path 226 leads processor 31P to nonpertinent steps 227 followed by processor 31P accessing LDCB 62 at 228 to store the generated cache address in section 118 of RPARMS 83. Then following nonpertinent steps 229, processor 31P proceeds through connector 235 to the logic steps shown in FIG. 8.

The connection between FIGS. 7 and 8 is through connector A denominated by numerals 235 and 240, respectively, in FIGS. 7 and 8. At 241 processor 31P updates the pointer to SSAR 97 by incrementing EK 121 of FIG. 3. At 242 processor 31P determines whether or not all of the blocks to be transferred to cache 40 have received allocations in cache 40. If not, through connector B 243 processor 31P returns to FIG. 7 flow chart at B 207 to allocate another cache 40 slot. This loop is repeated until EK 121 contains a count equal to the number of blocks to be transferred (not more than eight).

After completing the loop, some nonpertinent logic steps are performed at 244. At 245, the READ code command is set into the ICW representing a READ data command for DASD 16. At 250, LDCB 62 is accessed to determine whether or not the sequential flag SEQ 100 in PPARMS 81 is set or reset. When set, processor 31P at 251 determines whether or not the received block count is greater than one. If it is greater than one, then a chaining indication is set in command modifier byte 27 of ICW 24 (FIG. 1); otherwise, from steps 250 or 251 the end of chain indication EOC is indicated in byte 27 by resetting the chain indicator. At 254 the device buffer 77 in control store 73 receives the ICW, i.e., the code permutation flags and other storage operation (STOROP) indications. At 255, processor 31P again examines SEQ 100 of LDCB 62 for nonsequential data, i.e., SEQ=0. If Only one data block is to be transferred, processor 31P follows logic path 256 to execute logic step 257 for transmitting the just constructed ICW to DAC 56P via LKP 25.

For a sequential data transfer, processor 31P leaves step 255 to execute logic step 260 for adjusting EK 121 to the next entry (set next). Then at 261, if the remaining block count is not greater than one then the ICWs are transmitted to DAC 56 in step 257. For a number of blocks remaining greater than one, loop 270 is executed for setting up the remaining ICWs for a chain of such ICWs. At 271, the command is set for read count, key, data and multi-track commands. At 272 processor 31P determines whether or not the last block in a sequential group of blocks is to be processed. If not, the CHAINING flag in byte 27 of the ICW being built is set to unity. Otherwise, at 274 the end of chaining condition is indicated by resetting the CHAINING flag. At 275 the just-conducted ICW is transferred to the device buffer 77. At 276 the cache CADDR address is stored in the device buffer such that it can be transferred immediately to SSAR 97 for the burst transfer. At 277 processor 31P determines if the current data block is the last data block to be transferred; if not, the loop is indexed at 278 adjusting a count in an internal register (not shown) using usual control techniques. Otherwise, step 257 is performed. When the loop is indexed at 278 the steps 271 through 277 are again performed.

DAC 56P upon receiving the ICW chain executes the chain in the same manner that it executes host-supplied commands received through channel adaptors 32. Since this latter operation is well known, the execution of the ICW chains is not further described. It should be noted that in transferring signals from DASD 16-18 to cache 40, DAC 56P not only provides the addressing to DASD 16-18 but also transfers the cache address contents of device buffer 77 into SSAR 79 such that several blocks of data can be transferred in a single data stream, i.e., can be a multitrack transfer. Upon completion of that transfer, DAC 56P loads the resulting status, including error indications, into LKP 25. Processor 31P operation then switches from DAC 56P to CAC 61P.

Figure 9:
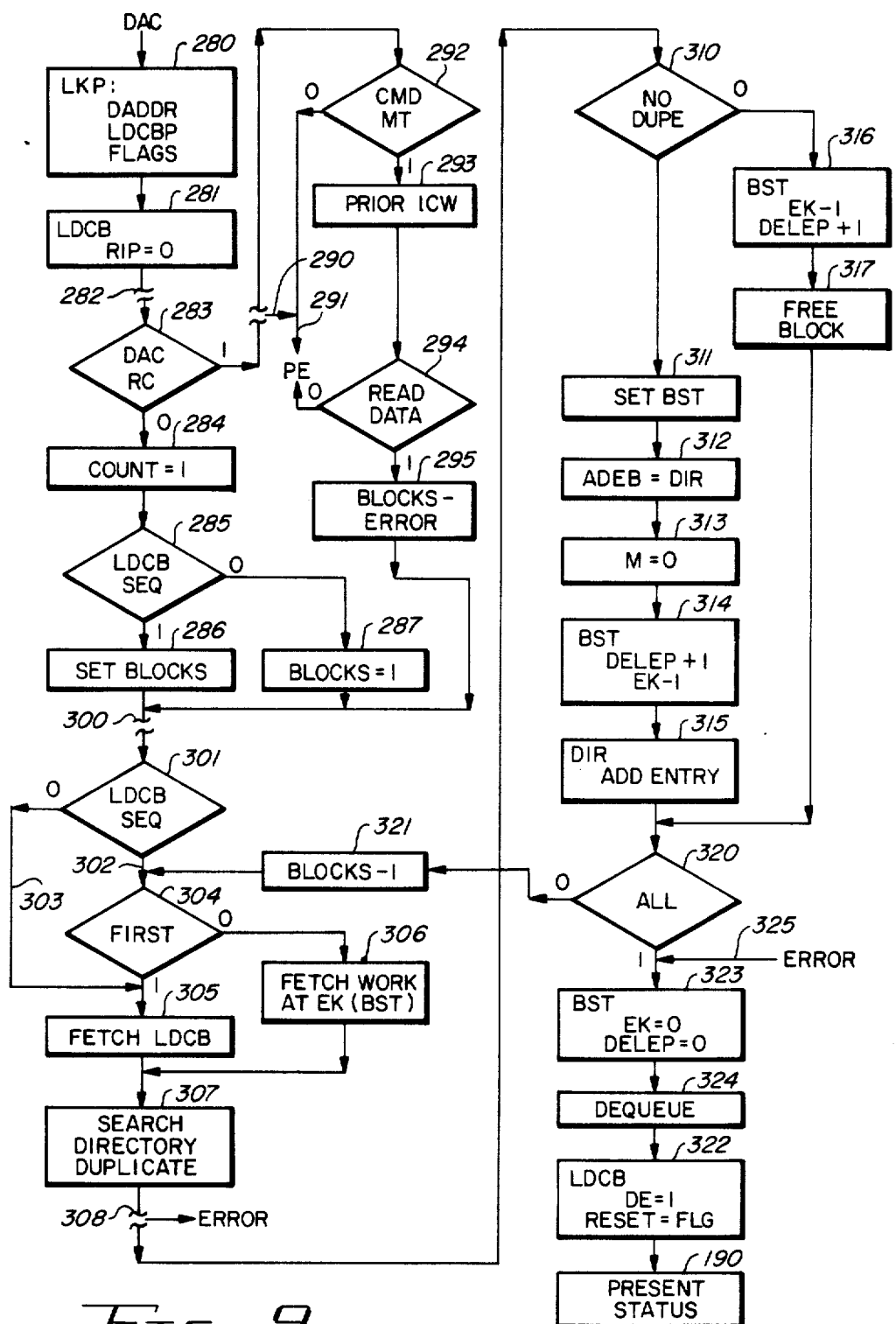
FIG. 9 is a logic flow chart showing post data-promotion processing for large sequential data sets in connection with practicing the present invention in the FIGS. 1 and 2 illustrated peripheral memory system.

FIG. 9 illustrates the portion of CAC 61P called post processing, i.e., logic steps performed following the transfer of data signals from DASD 16 to cache 40. First the contents of LKP 25 are transferred to work registers (not shown) at step 280. This includes the device address, the pointer to LDCB 62 and any flags generated by DAC 56P. At 281, processor 31P accesses LDCB 62 for resetting RIP 111 to zero for indicating that no read from a DASD is in progress. At 282 some nonpertinent logic steps are performed. At 283 processor 31P examines the DAC 56P return code (RC) for an error free condition; for a successful transfer of all requested blocks of data to cache 40 a return code of zero is provided. For such a successful operation, the contents of an internal work register (not shown) of processor 31P is set to unity at 284. This initializes the count. At 285, LDCB 62 is accessed for examining SEQ 100. If the transfer is not sequential, i.e., only one data block is transferred, then the number of blocks being transferred is set to unity at 287. Otherwise at 286 the number of blocks allocated as stored in device buffer 77 is transferred to EK 121 to indicate the number of entries in BST 78.

For an error condition at step 283, i.e., RC does not equal zero, an error analysis set of logic steps are performed at 290. If a permanent error is indicated by such analysis, processor 31P follows path 291 to a permanent error recovery and reporting procedure beyond the scope of the present description. Otherwise at 292, processor 31P determines whether or not the command was a multi-track command, i.e., more than one block of data was to be automatically transferred. If not, an error condition would effect a single block, therefore a permanent error has to be handled causing processor 31P to follow logic path 291. If a plurality of data blocks were transferred, then further action can occur, i.e., one data block may be in error while all of the preceding data blocks were transferred error free. DAC 56P has identified via LKP 25 which block caused the error. CAC 61P from the DAC 56P information can identify which ICW is associated with the error. Processor 31P then fetches the ICW immediately preceding the ICW in error at 293 from device buffer 77. At 294, if the command in the ICW was for reading data from DASD 16 to cache 40, processor 31P at 295 adjusts the block count by subtracting the number of blocks following the error from the slots allocated. At 294 for a command in error other than a READ data command, the error occurred before any data transfer; processor 31P goes to a permanent error routine (not described). From steps 286, 287 or 295, some nonpertinent logic steps are performed at 300. Such logic steps pertain to internal addressing, not pertinent to an understanding of the present invention. At 301, processor 31P accesses LDCB 62 SEQ 100 to determine whether or not a sequential transfer is indicated. For a sequential transfer, logic path 302 is followed to step 304 to determine whether or not the data block transferred was the first data block in the sequence. For the first data block being transferred in a sequence of data blocks or in a nonsequential mode, wherein only one block is transferred, processor 31P at 305 transfers the contents of LDCB 62 to a work register (not shown) for the ensuing logic steps. This includes transferring the logical cylinder indication CCL (see 108), record number R, the logical device address D and other control data not pertinent to an understanding of the invention. For a data block which is not the first data block, processor 31P at 306 accesses BST 78 (FIG. 3) to obtain the directory index for that data block as indicated by DELEP 121. For the first data block or for a nonsequential data block, directory 43 index 114 of LDCB provides the same information.

For the directory 43 search, processor 31P at 307 looks for the cache address (ADDR) corresponding to the device address. This search includes a hashing operation to determine whether or not the directory 43 has an entry corresponding to the block of data just transferred from DASD 16 to cache 40. Remember that several parallel accesses to the same DASD 16 are possible in an asynchronous manner; therefore it is important that one and only one replication of DASD 16 data be in cache 40. This requirement provides data integrity, i.e., if duplicate copies were in cache 40, one copy could be updated while a second copy could be erroneous. Then the updated copy could be stored in DASD 16, that entry being erased; later access by a host to the system 10 could result in the erroneous data residing in cache being sent to the host via channel adaptor 32.

Following a search, error indications are checked at 308. For no errors, at 310 processor 31P determines whether or not a duplicate copy was found. For no duplicate at 311, the BST 78 entry is calculated, i.e. the DELEP 120 value, BST 78 is accessed for pointing to the directory index (numerals 122-123 of FIG. 3) such that the directory 43 entry corresponding to the DASD 16 address is transferred from directory 43 to ADEB 76 for convenient access by processor 31P, all action occurring at 312. At 313, processor 31P resets bit M 269 in ADEB 76. M indicates modified data in cache 40. Resetting M to zero indicates that the copy in cache 40 is identical to the copy stored in DASD 16-18. At 314, BST 78 is again accessed for incrementing DELEP 120 and decrementing EK 121. At 315 a directory 43 entry is added corresponding to the data block just transferred to cache 40; that is, when DAC 56P caused the block of data to be transferred to cache 40, directory 43 had not yet been updated, i.e., the data just stored in cache 40 is not yet addressable. By creating a directory entry in the usual manner at 315, the just-transferred data from DASD 16-18 to cache 40 becomes addressable.

On the other hand, if a duplicate is found at 310, it is assumed that the data already in cache 40 is the correct copy, i.e., it may have been modified. Therefore, it is desired not to make the just-transferred data block addressable and to proceed to the next data block. At 316 BST 78 is accessed for decrementing EK and incrementing DELEP. The block just transferred is freed at 317 leaving only a single copy of the data in cache 40. Freeing the block makes it nonaddressable.

The final housekeeping logic functions occur beginning with step 320 determining whether or not all of the data blocks transferred from DASD 16-18 to cache 40 have been post processed. If not, at 321 the number of blocks to be post processed is decremented by one. Processor 31P then follows logic path 302 to execute a loop including steps 304 through 315.

At 323, BST 78 is accessed for resetting EK and DELEP to zero. Step 323 is also entered from PE logic path 291 via logic path 325. At 324, queue registers 69 are accessed for removing the queue entry from the queue such that a duplicate read will not occur. You will recall that in FIG. 6 the READ was enqueued at 164. Then at 322 LDCB 62 is accessed for resetting control flags, such as CCR 95, MISS 96, RA 112, and the like, and for posting a DEVICE END, such as by setting ODE 90. At 190 status is presented to the host via ACE 50P. In all of the above description it should be noted that the transfer of data blocks from DASD 16-18 to cache 40 and in the reverse direction is on an asynchronous basis with respect to the operation of the channel adaptors 32. Under certain circumstances, a request from a host through a channel adaptor 32 can take priority over the internal data transfer, therefore some of the just-described operations may be interleaved with higher priority operations. Since multiprocessing is well known this detail is not further discussed.

While the invention has been particularly shown and described with reference to preferred embodiments thereof, it will be understood by those skilled in the art that various changes in form and details may be made therein without departing from the spirit and scope of the invention:

What is claimed is:

1. A storage system having connection means connected to a host processor and having a high-speed data cache and a slow-speed backing store connected to said connection means, transferring means connected to said connection means and to said cache and backing store for transferring data between said cache and backing store, said cache and backing store each having a plurality of addressable data storage registers;

the improvement comprising:

first means coupled to said connection means for receiving from said connection means and storing an intent signal identifying an address of said data storage registers in the backing store for identifying predetermined sequential ones of said data blocks and limit means in the first means for indicating the numerical extent of such data blocks up to a predetermined maximum number of such data blocks to be transferred between said backing store and said cache in a single data transfer operation;

read means in said transferring means and connected to said connection means and to said cache for transferring data, as a peripheral data storage operation, to said connection means from said cache and for storing backing store addresses indicating which of said sequential blocks of signals identified by said stored intent signal were sent to the connection means; and second means connected to said connection means for receiving read peripheral commands supplied by said host processor, connected to said transfer means and connected to said first means for being responsive to said stored intent signal and a read peripheral command received from said connection means for any one of said identified predetermined sequential data blocks to activate said transfer means to transfer, as a peripheral data storage operation, from said backing store to said cache, all of the said sequential data blocks identified by said received intent signal beginning with said any one of said identified sequential data blocks plus successive ones of said identified data blocks up to said predetermined maximum number of the data blocks and only including those data blocks stored in said backing store indicated by said received intent signal.

2. The system set forth in claim 1, wherein said cache has a predetermined number of address registers, each said address register for storing an address of said addressable storage registers of said cache, and said predetermined number of address registers equalling said predetermined maximum number.

3. The system set forth in claims 1 or 2, wherein said backing store has a plurality of cylinders of storage registers, access means in said transferring means to access said registers in different ones of said cylinders but having access time delays in accessing a cylinder other than a cylinder last accessed much larger than required to access any track within said cylinder last accessed, said access means connected to said second means for limiting the number of data blocks in each said peripheral data storage operation of said transfer means to a transfer of data blocks from said backing store to said cache only those data blocks stored in one cylinder of said backing store.

4. The system set forth in claim 1, further comprising:
said second means further having command means connected to said connection means for receiving peripheral commands, including a one of a given plurality of logical device addresses, from said connection means which indicate by said one included address for for addressing sequential ones of said data blocks stored in said backing store addressable data storage registers; and
logical device means coupled to said command means and said read means for storing said received peripheral commands and having means for addressing one set of said addressable data storage registers using any of said given plurality of logical device addresses.

5. The storage system set forth in claim 1, 2 or 4, wherein said second means includes means for receiving a chain of a certain plurality of said peripheral commands for activating the storage system to perform said certain plurality of said peripheral data storage operations, respectively; and
control means connected to said cache and to said second means for receiving predetermined ones of said chained peripheral commands from said second means and for generating a plurality of chained ICW commands, each of said ICW commands including identification of a data storage operation to be performed and an address of said backing store addressable data storage register at which the identified data storage operation is to be performed, from said received certain plurality of said peripheral commands, respectively, for commanding data transfers between said cache and said backing store and for supplying said ICW commands to said second means for activating said second means to effect the ICW commands commanded data transfers between said cache and backing store in the same sequence as said peripheral commands were received from said connection means and said second means having means for interleaving executions of said peripheral commands directly received from said connection means by said transfer means amongst execution of said ICW commands commanded data transfers.

6. The storage system set forth in claim 5, further including a first plurality of addressable cache address registers connected to said data cache for respectively storing cache addresses of said ICW commands.

7. A peripheral data storage system having a plurality of addressable direct access data storage devices (DASD), each of said DASDs including a plurality of addressable data storage cylinders with each cylinder having a plurality of addressable data storage segments, each of said data storage segments having a predetermined data storage capacity;
a high-speed random-access buffer having a first plurality of storage address registers and a plurality of addressable buffer segments having the same data storage capacity as the data storage capacity of said data storage segments and said buffer segments addressed by any one of said first plurality of storage address registers of said buffer;
means for allocating random ones of said buffer segments to store a copy of data stored, or to be stored, in predetermined sequential ones of said data storage segments;
means for storing addresses of said allocated random ones of said buffer segments into said first plurality of storage address registers, respectively; and
means for sequentially, without interruption, transferring said first plurality of said blocks of data from a one of said DASDs to said buffer at said buffer addresses stored in said storage address registers and limiting the data transfers to said data storage segments identified in said plural address registers to a one of said cylinders.

8. The peripheral storage system set forth in claim 1, wherein said backing store includes a plurality of addressable direct access data storage devices (DASD), each of said DASDs including a plurality of addressable data storage cylinders with each cylinder having a plurality of addressable data storage segments, each of said data storage segments having a predetermined number of said addressable data storage registers and limiting means coupled to said means for transferring for limiting said data transfer of a first plurality of blocks of data to blocks of data stored within one data storage cylinder.

9. The peripheral storage system set forth in claim 8, further including means connected to said means for transferring for defining an addressable extent of said DASD for indicating data storage segments by addresses within the addressable extent and said limiting means limiting the number of said first plurality of blocks to those blocks of data stored within one of said data storage cylinders and within said defined extent.

10. In a peripheral storage system having a plurality of addressable direct access storage devices (DASDs), each of said DASDs having a plurality of addressable cylinders, each said cylinder having a plurality of addressable memory segments, a high-speed buffer store having a plurality of buffer segments each having a capacity equal to the capacity of said memory segments, means for attaching the system to a host processor for receiving peripheral commands therefrom and for transferring data therewith;

means to receive peripheral commands from an attached host processor to fetch data stored in said DASDs;

a digital processor having a control store for storing programs of instructions for operating the storage system;

signal means connected to said DASDs, said buffer and said means for attaching for transferring data between said DASD, said buffer, and said attached host;

the improvement comprising:

program means in said control store for enabling said processor to operate the storage system to transfer one segment of data from said DASDs to said high-speed buffer store for each request for a segment of data from said host;

further program means in said control store for enabling said processor to receive an extent indication from said host that a number of segments of data are to be transferred from a like number of memory segments in said DASD from which said data will be fetched, program means for decrementing said number of segments to be transferred to the host each time a segment is transferred to said host; and transfer program means for enabling said digital processor to operate said storage system, upon receipt of a read command received from said host, via said means for attaching, for a given segment of data contained with a memory segment, defined within said extent indication, to transfer a copy to said buffer of all segments of data beginning with the requested segment together with all sequentially subsequent segments identified in said extent indication, whether requested or not, and stored within said extent indication in said DASD 11. The peripheral storage system set forth in claim 10 further including program means in said control store for enabling the processor to operate the storage system to limit the number of segments of data being transferred in a sequence of data transfers between a one of said DASDs and said buffer store to segments stored in a given one cylinder of said one DASD during one sequence of segment transfers.

12. The peripheral storage system set forth in claims 10 or 11, further including a plurality of address registers in said buffer store for independently addressing any one of said buffer segments; and said program means further enabling said processor to only transfer a maximum number of segments of data from a DASD in a single sequence of segment transfers equal to the plurality of said address registers.

13. The peripheral storage system set forth in claims 10 or 11, further including a program means for enabling said processor to operate said system to separately enqueue a plurality of read operations to be independently performed with each of said addressable DASDs, respectively.

14. The peripheral storage system set forth in claim 13, further including program means in said control store for enabling said processor to accept any one of a plurality of logical device addresses received from said means with any requested read operation for each of said addressable DASDs, such that each of said memory segments can be addressed through any one of a said plurality of said logical addresses;

additional program means stored in said control store for additionally enabling said processor for enqueuing said read operations for each said DASD in accordance with the order of receipt of said received requests for read operations using any of said logical addresses; and further program means stored in said control store for further enabling said processor to access each DASD via a fourth address for each of said DASDs, which fourth address enables directly accessing each such DASD to thereby bypass said buffer store.

* * * * *